United States Patent [19]

Presby

[11] 4,368,063
[45] Jan. 11, 1983

[54] METHOD OF FABRICATING A TAPERED TORCH NOZZLE

[75] Inventor: Herman M. Presby, Highland Park, N.J.

[73] Assignee: Bell Telephone Laboratories, Incorporated, Murray Hill, N.J.

[21] Appl. No.: 251,259

[22] Filed: Apr. 6, 1981

[51] Int. Cl.³ .............................................. C03B 23/13
[52] U.S. Cl. .......................................... 65/42; 65/56; 65/108; 29/157 C
[58] Field of Search ............. 29/157 C; 239/423, 424, 239/424.5, 425; 65/36, 54, 56, 42, 68, 70, 105, 108; 72/302, 275

[56] References Cited

U.S. PATENT DOCUMENTS

| 1,906,315 | 5/1933 | Davis et al. | 65/36 |
| 2,215,019 | 9/1940 | Smith | 29/157 C |
| 2,217,194 | 10/1940 | Bryce et al. | 29/157 C |
| 2,243,184 | 5/1941 | Aronson et al. | 29/157 C |
| 2,374,269 | 4/1945 | Breadner et al. | 65/54 |
| 2,475,431 | 7/1949 | Luertzing | 65/56 |
| 2,714,833 | 8/1955 | Gilbert | 239/424 |
| 3,455,667 | 7/1969 | Snitzer et al. | 65/42 |
| 3,966,446 | 6/1976 | Miller | 65/2 |

FOREIGN PATENT DOCUMENTS 2818259  9/1979  Fed. Rep. of Germany ........ 65/108

Primary Examiner—Daniel C. Crane
Attorney, Agent, or Firm—S. Sherman

[57] ABSTRACT

VAD torches include a plurality of coaxially aligned tubes. A typical outside diameter is about 1 inch. To fabricate smaller torch nozzles, spacers (20, 21, 22) are symmetrically placed between adjacent tubes (11, 12, 13, 14), and the entire tube assembly heated and drawn as a unit to reduce its diameter. The drawn tubes are then cut at a point along the reduced diameter region to produce a torch whose nozzle has the desired (i.e., reduced) diameter.

3 Claims, 4 Drawing Figures

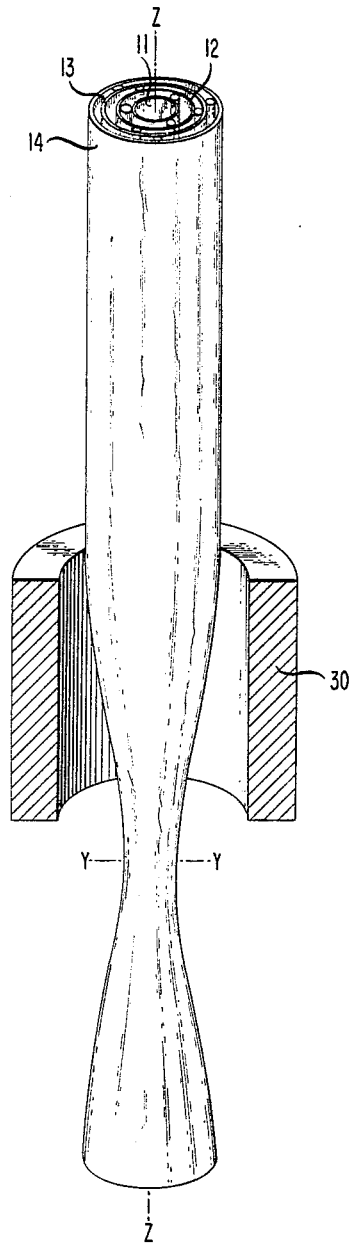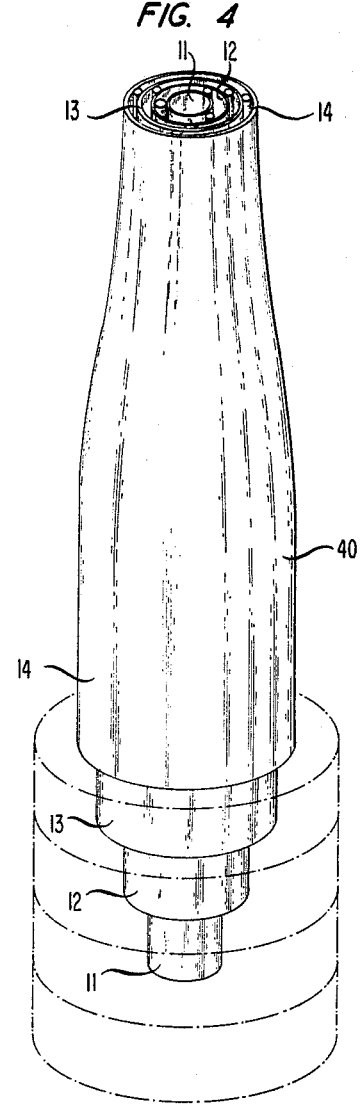

METHOD OF FABRICATING A TAPERED TORCH NOZZLE

TECHNICAL FIELD

This invention relates to torches and, in particular, to torches for use in the fabrication of optical fiber preforms by means of the vapor-phase axial deposition (VAD) process.

BACKGROUND OF THE INVENTION

In the vapor-phase axial deposition (VAD) method of fabricating optical fiber preforms, material such as, $SiCl_4$, $GeCl_4$, $POCl_3$ and $BBr_3$ are fed into an oxyhydrogen torch, and the fine glass particles produced by a flame hydrolysis reaction are deposited onto the end surface of a rotating support member. (See, U.S. Pat. No. 3,966,446.) The porous boule thus formed is then consolidated into a transparent preform by heating.

At present, the boule forms that are fabricated by this process are quite large in diameter. Typically, they are at least two inches across. Inasmuch as readily available existing ovens can handle forms no larger than one inch in diameter, it is readily apparent that the processing of VAD boules (i.e., heating for consolidation and pulling into fibers) presents a problem. Larger ovens could, of course, be constructed but at great expense.

The reason for the large boules is the large torch size. A given torch produces a given size boule. Torches currently in use are unitary, fused silica glass structures comprising a plurality of coaxially aligned cylindrical tubes with means for feeding the various materials to the several cylinders. Due to the difficulty of working with fused silica and the specific geometry requirements of the torch, it is very difficult, if indeed possible, to fabricate smaller torches using current fabrication techniques.

Significant improvements have been realized in torch design by the universal torch configuration described in my copending application Ser. No. 248,906, filed Mar. 30, 1981, to be abandoned in favor of applicant's continuation-in-part copending application Ser. No. 363,093, filed Mar. 29, 1982. Such torches comprise a plurality of coaxially aligned tubes, each of which terminates at, and is connected to a separate base chamber. The latter are bolted together to form the torch structure. Feed sources supply the different materials to the respective chambers which, in turn, feed the materials to each of the several tubes.

Because the torch is built up from separate components, it is easy, within limits, to reduce the nozzle size simply by reducing the diameter of the tubes comprising the torch. However, because each tube has a uniform diameter over its entire length, the soot disperses upon leaving the torch and the boule size cannot be reduced as much as one would wish. It would be highly desirable if the torch was capable of focusing the glass soot. This would not only reduce the size of the boule but would additionally, and very advantageously, increase the efficiency of the deposition process as the glass soot would be directed to the deposition surface.

SUMMARY OF THE INVENTION

A torch made in accordance with the present invention has a tapered nozzle of smaller size than can be realized in accordance with prior art fabrication techniques. The method of fabricating a torch nozzle in accordance with the invention comprises the steps of: coaxially aligning a plurality of tubes by symmetrically placing at least three spacer elements between adjacent pairs of tubes; heating the tubes thus assembled over a region along its length until it softens; pulling the assembly of coaxially aligned tubes in an axial direction to reduce its diameter; and then cutting the tubes, after they cool, at a point along its reduced diameter region.

By heating and pulling the tube assembly as a unit, the geometry of the torch is preserved as its diameter is reduced. Furthermore, the gradual tapering of the torch nozzle provides the added focusing effect not present in torches of uniform diameter.

BRIEF DESCRIPTION OF THE DRAWINGS

FIG. 3 shows the drawing of the tube assembly;
and
FIG. 4 shows the resulting torch nozzle.

DETAILED DESCRIPTION

Figure 1:
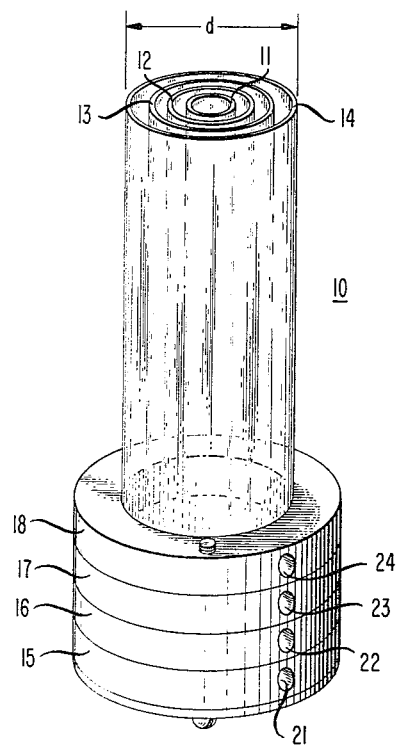
FIG. 1 shows a prior art torch.

Referring to the drawings, FIG. 1 shows a prior art universal torch of the type described in my above identified copending application comprising a plurality of coaxially aligned cylinders 11, 12, 13 and 14, each of which terminates at and is secured to a separate hollow base chamber 15, 16, 17 and 18, respectively. The entire assembly is held together by suitable means to form the torch structure.

The materials of combustion and other reactants are introduced into the chambers through a first set of apertures 21, 22, 23 and 24 and, from the chambers, the materials enter into the respective tubes through a second set of apertures (not shown).

Figure 2:
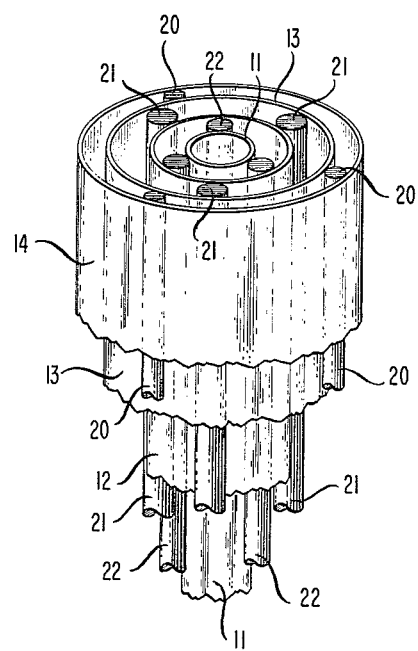
FIG. 2 shows the preparation of the tube assembly by the insertion of rods between the tubes.

In this arrangement, each of the tubes which make up the nozzle portion 10 of the torch is of uniform diameter over its entire length. The effective diameter of the nozzle is the diameter, d, of the largest tube 14. The nozzle diameter can, of course, be reduced by using tubes of smaller diameter. However, to impart a focusing effect, in addition to reducing the nozzle diameter, would require the use of tapered tubes which are assembled after they are tapered. This has proved difficult to do as a practical matter. An alternative technique, in accordance with the present invention, is to taper all the tubes simultaneously in a single operation. This is accomplished by taking tubes having the desired relative sizes and spacing them apart by the insertion of spacers between adjacent pairs of tubes. This is illustrated in FIG. 2 which shows tubes 11, 12, 13 and 14 coaxially aligned by means of groups of rods 20, 21 and 22. More particularly, three rods 20 are symmetrically placed between tubes 14 and 13; three rods 21 are symmetrically placed between tubes 13 and 12; and three rods 22 are symmetrically placed between tubes 12 and 11.

The tubes, thus assembled, are mounted in an oven 30 (of the type typically used to draw fibers from a fiber preform) and the assembly heated over a region of its length until it softens. When this occurs, the tube assembly is pulled as a whole in the axial direction, as illustrated in FIG. 3, until its cross-sectional dimension is reduced to the desired size.

The assembly is permitted to cool and is then cut at the desired point (i.e., y—y) along the reduced diameter region. It is also trimmed at its other end to produce a torch nozzle 40 as illustrated in FIG. 4. The latter figure shows the tapered end at which combustion occurs, and the opposite ends of the tubes trimmed for insertion in the several base chambers which are shown in phantom.

In an illustrative embodiment of the invention, fused silica tubes and fused silica rods were used. The weight of the tube assembly below the oven was sufficient to draw the tubes once they were softened. The fusing of the rods and tubes in the heated region maintained the geometry of the nozzle after it was cut to size, resulting in a geometrically stable torch assembly.

While four tubes are shown in the illustrative embodiment, more or fewer tubes can be included in the tube assembly as required. Similarly, whereas rods are shown used as spacer elements, tubes can alternatively be utilized.

What is claimed is:

1. A method of fabricating a torch nozzle comprising the steps of:
   forming an assembly of coaxially aligned glass tubes (11, 12, 13, 14) by placing spacers (20, 21, 22) between adjacent pairs of tubes (14-13, 13-12, 12-11);
   heating said assembly of tubes (40) over a limited region of its length until softened;
   pulling said assembly of tubes (40) in an axial direction to reduce its diameter along said limited region;
   and cutting said tubes at a point (y—y) along its reduced diameter region thereby forming a torch nozzle having a tapered end.

2. The method according to claim 1 wherein at least three spacers are symmetrically placed between adjacent pairs of tubes.

3. The method according to claim 1 wherein said tubes and said spacers are made of fused quartz.

* * * * *